(12) United States Patent
Stationwala et al.

(10) Patent No.: US 9,906,290 B2
(45) Date of Patent: Feb. 27, 2018

(54) METHOD FOR NETWORK MERGING AND CONFIGURATION SHARING AND ASSOCIATED APPARATUS

(71) Applicant: MediaTek Singapore Pte. Ltd., Singapore (SG)

(72) Inventors: Hasan Ali Stationwala, Indore (IN); Raghav Monga, Chandigarh (IN); Amit Kumar Shakya, New Delhi (IN); Prakhar Vig, Ghaziabad (IN); Rakesh Lavji Parmar, Maharashtra (IN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/370,087

(22) Filed: Dec. 6, 2016

(65) Prior Publication Data
US 2017/0085313 A1    Mar. 23, 2017

(51) Int. Cl.
| | |
|---|---|
| H04B 3/36 | (2006.01) |
| H04B 7/155 | (2006.01) |
| H04W 76/02 | (2009.01) |
| H04W 52/02 | (2009.01) |
| H04W 84/12 | (2009.01) |

(52) U.S. Cl.
CPC .... H04B 7/15592 (2013.01); H04W 52/0203 (2013.01); H04W 76/021 (2013.01); *H04W 84/12* (2013.01); *Y02B 60/50* (2013.01)

(58) Field of Classification Search
USPC .......... 455/15, 450–455, 41.1–41.3, 7, 11.1, 455/12.1, 13.1, 25
See application file for complete search history.

(56) References Cited

U.S. PATENT DOCUMENTS

| | | | | |
|---|---|---|---|---|
| 2015/0127733 | A1* | 5/2015 | Ding | H04W 4/08 709/204 |
| 2017/0012821 | A1* | 1/2017 | Sa | G06F 1/1632 |
| 2017/0026282 | A1* | 1/2017 | Huang | H04L 45/122 |
| 2017/0134232 | A1* | 5/2017 | Palanciuc | H04L 41/0893 |

* cited by examiner

*Primary Examiner* — Fayyaz Alam
(74) *Attorney, Agent, or Firm* — Han IP Corporation; Andy M. Han

(57) ABSTRACT

Each independent repeater network may be associated with a respective network weight and a respective group identifier. When two repeater networks with the same group identifier merge, configuration may flow from the network with a higher network weight to the network with a lower network weight. When two repeater networks with different group identifiers merge, configuration may flow from the connecting host interface of a repeater of one of the networks to the connecting client interface of a repeater of the other network. In cases of simultaneous connection between two networks, group identifier change may take precedence over configuration update caused by the merging of the two networks.

19 Claims, 10 Drawing Sheets

METHOD FOR NETWORK MERGING AND CONFIGURATION SHARING AND ASSOCIATED APPARATUS

TECHNICAL FIELD

The present disclosure is generally related to computer networking and, more particularly, to merging and configuration sharing for repeater networks.

BACKGROUND

Unless otherwise indicated herein, approaches described in this section are not prior art to the claims listed below and are not admitted to be prior art by inclusion in this section.

In general, when multiple un-configured repeaters with a common group identifier (group ID) boot up at the same time, the repeaters will connect amongst themselves to form several independent networks. The repeaters of an independent network share the same service set identifier (SSID), pairwise master key (PMK) and channel(s), and the several independent networks will operate on different SSIDs, PMKs and channels. When two of such independent networks merge, there needs to be a mechanism to transfer configuration of one network to the other network.

In the context of dual-band repeaters, since two client (CLI) interfaces are available on each repeater, a single repeater can connect to two different repeaters and accept configurations from those two different repeaters. FIG. 10 shows dual-band repeaters D1, D2 and D3, each of which having two host interfaces for communications over two frequency bands (labeled as "A2" and "A5" in FIG. 10) as well as two client interfaces for communications over the two frequency bands (labeled as "C2" and "C5" in FIG. 10). For example, interfaces A2 and A5 may be host interfaces in the 2.4 GHz and 5 GHz frequency bands, respectively, and interfaces C2 and C5 may be client interfaces in the 2.4 GHz and 5 GHz frequency bands, respectively. In FIG. 10, even though repeater D1 and repeater D3 are not directly connected to each other, their configurations should be the same as they are part of the same network. There needs to be a mechanism for repeater D2 to decide which direction in which configuration flow or transfer is to happen (e.g., whether configuration transfer should be from repeater D2 to repeater D1 or from repeater D2 to repeater D3).

Moreover, if multiple networks with different group IDs exist within a range, such multiple networks will not merge and share configurations automatically. However, if merging of two of such networks is required, there needs to be a mechanism to allow connection between the two networks without considering the different group IDs. There also needs to be a mechanism for the two networks to determine in which direction configuration is to flow or be transferred from one of the two networks to the other network.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose novel schemes, systems, apparatuses and methods to merge multiple independent repeater networks with separate wireless configurations into a single repeater network with a common wireless configuration. The proposed schemes enable a repeater to decide which direction in which configuration flow or transfer is to happen. The proposed scheme enable connection between two networks with different group IDs when merging. The proposed schemes also enable such two networks to determine in which direction configuration is to flow or be transferred from one of the two networks to the other network.

In one aspect, a method may involve a first communication device (e.g., a first repeater) establishing a communication link with a second communication device (e.g., a second repeater) to connect to the second communication device. The first communication device may be associated with a first weight and/or a first group identifier. The second communication device may be associated with a second weight and/or a second group identifier. The method may also involve the first communication device determining whether the first group identifier and the second group identifier are identical. In response to a determination that the first group identifier and the second group identifier are identical, the method may involve the first communication device determining which of the first weight and the second weight is higher. In response to a determination that the second weight is higher than the first weight, the method may involve the first communication device adopting a configuration of the second communication device by receiving data related to the configuration of the second communication device from the second communication device. In response to a determination that the first weight is higher than the second weight, the method may involve the first communication device transmitting data related to a configuration of the first communication device to the second communication device such that the second communication device adopts the configuration of the first communication device.

In another aspect, a method may involve a first communication device (e.g., a first repeater) scanning wireless communication channels to identify one or more other communication devices. In response to identifying a second communication device which communicates on a channel different from a channel on which the first communication device communicates, the method may involve the first communication device establishing a communication link with the second communication device to connect to the second communication device. The method may also involve the first communication device adopting a configuration of the second communication device. Action frame(s) may be sent before initiating the scanning of wireless communication channels so that peers do not disconnect. Moreover, host interface and client interfaces of the first communication device may switch to communicate on the channel on which the second communication device communicates, and may exit from a powersave mode.

In another aspect, an apparatus may be implementable in a first communication device (e.g., a first repeater) of a plurality of communication devices (e.g., multiple repeaters). The apparatus may include a memory and a processor. The memory may be configured to store one or more sets of instructions. The processor may be coupled to access the memory to execute the one or more instructions and, upon executing the one or more sets of instructions, the processor is configured to perform a number of operations in accordance with the present disclosure pertaining to merging and configuration sharing. The processor may establish a communication link with a second communication device of the plurality of communication devices to connect to the second communication device, with the first communication device associated with a first weight and/or a first group identifier, and with the second communication device associated with a second weight and/or a second group identifier. The processor may determine whether the first group identifier and the second group identifier are identical. In response to a determination that the first group identifier and the second group identifier are identical, the processor may determine which of the first weight and the second weight is higher. In response to a determination that the second weight is higher than the first weight, the processor may adopt a configuration of the second communication device by receiving data related to the configuration of the second communication device from the second communication device. In response to a determination that the first weight is higher than the second weight, the processor may transmit data related to a configuration of the first communication device to the second communication device such that the second communication device adopts the configuration of the first communication device.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
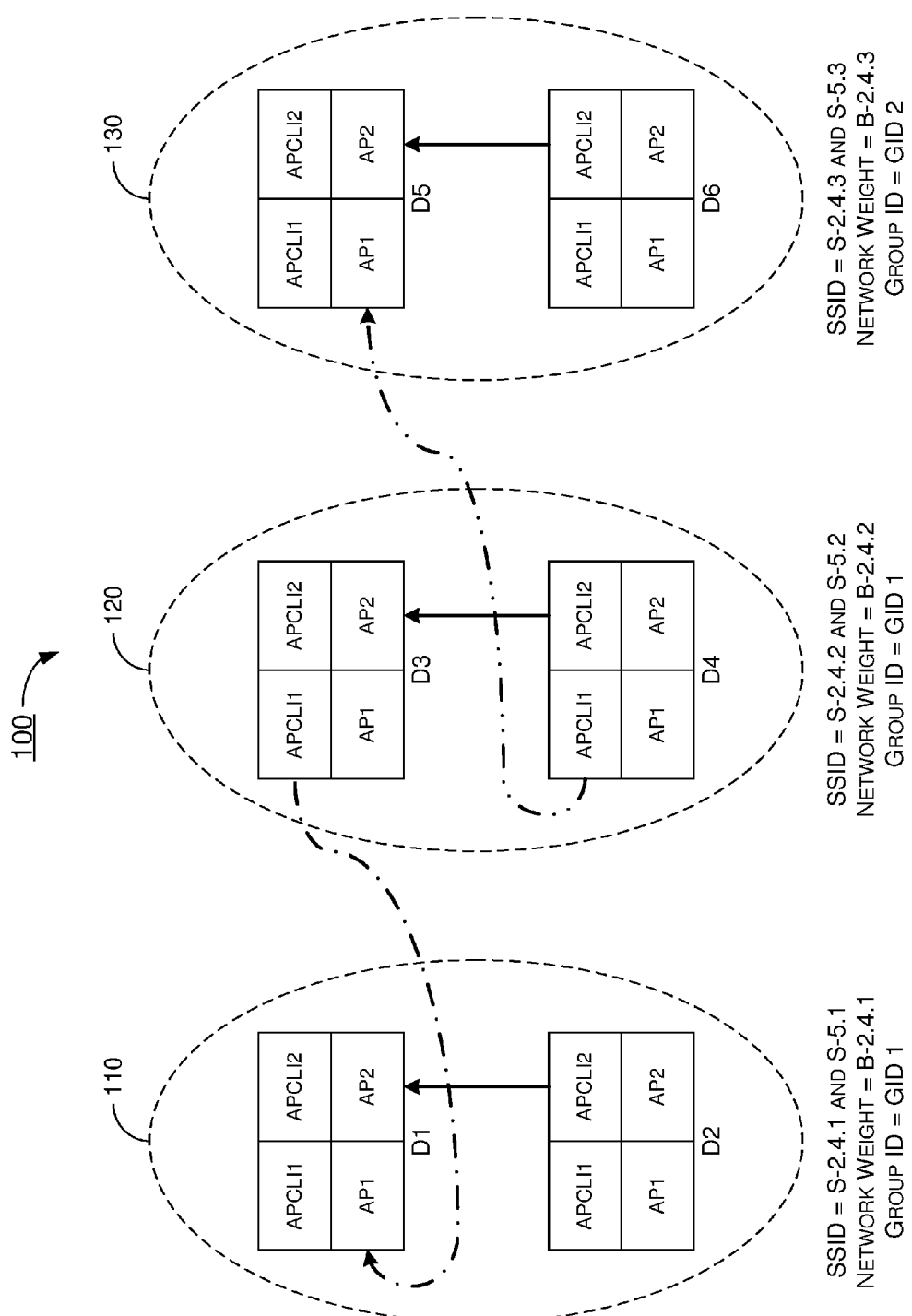
FIG. 1 is a diagram of an example scenario of merging and configuration sharing in a repeater network in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

In the present disclosure, each repeater may be a single-band or dual-band wireless device with one host or access point interface (hereinafter interchangeably referred as the "AP interface") and one client or station interface (hereinafter interchangeably referred as the "CLI interface" and the "APCLI interface") for each frequency band. In the present disclosure, when two repeaters establish a communication link to connect to each other, the communication link is between a CLI interface of one repeater and an AP interface of the other repeater. Moreover, one or more CLI interfaces of one or more repeaters may be simultaneously connected to a given AP interface of a repeater. In addition, a given AP interface of a repeater may accept requests for establishing a communication link from (and connect to) one or more CLI interfaces of one or more other repeaters as well as one or more third-party wireless stations (e.g., WiFi stations).

In the present disclosure, a network of repeaters may be a network of single-band or dual-band repeaters, and all repeaters in the network communicate on the same channel. The repeaters of a given network may have a common PMK, and may broadcast the same SSID. Additionally, in the present disclosure, when a repeater connects to another repeater, they may establish a communication link to connect with each other without any prior information of the SSID and PMK of the other repeater.

In the present disclosure, an un-configured repeater may be a standalone repeater which is not configured by a user or any other repeater in accordance with the present disclosure. An un-configured repeater may operate with a random SSID and a random PMK. In the present disclosure, a configured repeater may be a repeater which has been configured by a user or any other repeater in accordance with the present disclosure. A configured repeater may have a defined SSID and a defined PMK. In the present disclosure, a group ID may be a unique identifier for an entire network of repeaters. Any two repeaters with a common group ID may connect to form a new network automatically. Moreover, any repeater may connect to an existing network with the same group ID.

Under the proposed schemes, the direction of flow of configuration may be determined based on network weights of individual networks when two independent networks of repeaters merge to form a single network of repeaters. In various implementations in accordance with the present disclosure, each independent repeater network may be individually assigned a respective network weight and, when two networks with a same group ID merge, configuration may flow from the network with a higher network weight to the network with a lower network weight. That is, the network with a lower weight will adopt the configuration of the network with a higher weight.

Under the proposed schemes, independent networks of repeaters may connect despite having different group IDs. When two networks with different group IDs merge, configuration may flow from a host interface of a first repeater to a client interface of a second repeater that is communicatively connected to the host interface of the first repeater. In various implementations in accordance with the present disclosure, in cases of simultaneous connection between two networks, group ID change may take precedence over configuration update caused by the merging of the two networks. That is, the network having a repeater with a CLI interface connecting to an AP interface of a repeater of another network will adopt the configuration of the AP interface of the other network.

To aid better understanding of the various schemes proposed in the present disclosure, illustrative examples are provided below with reference to corresponding figures. It shall be understood that these examples are provided for illustrative purposes and, therefore, are not to be interpreted as limiting the scope of the present disclosure in any way.

FIG. 1 illustrates an example scenario 100, which illustrates how repeaters in independent repeater networks with different configurations and/or different group IDs may connect with one another in accordance with the present disclosure. In scenario 100, each of the independent repeater networks 110, 120 and 130 includes a number of repeaters. As shown in FIG. 1, network 110 includes repeaters D1 and D2, network 120 includes repeaters D3 and D4, and network 130 includes repeaters D5 and D6. Each of the repeaters D1, D2, D3, D4, D5 and D6 is capable of dual-band communications over two frequency bands, namely band 1 and band 2. Accordingly, as shown in FIG. 1, each of the repeaters D1, D2, D3, D4, D5 and D6 has the following interfaces: an AP interface for each of the two frequency bands (labeled as "AP1" and "AP2") and a CLI interface (hereinafter referred to as "APCLI interface" and "CLI interface") for each of the two frequency bands (labeled as "APCLI1" and "APCLI2"). In network 110, repeaters D1 and D2 are connected via the AP2 interface of repeater D1 and the APCLI2 interface of repeater D2. In network 120, repeaters D3 and D4 are connected via the AP2 interface of repeater D3 and the APCLI2 interface of repeater D4. In network 130, repeaters D5 and D6 are connected via the AP2 interface of repeater D5 and the APCLI2 interface of repeater D6.

In the example shown in FIG. 1, band 1 and band 2 are the 2.4 GHz band and the 5 GHz band in accordance with the Institute of Electrical and Electronics Engineers (IEEE) 802.11 specification. For network 110, the group ID is GID 1, with the basic service set identification (BSSID) of the AP1 interface of repeater D1 being B-2.4.1 and the service set identification (SSID) for the two frequency bands being S-2.4.1 and S-5.1, respectively. For network 120, the group ID is also GID 1, with the BSSID of the AP1 interface of repeater D3 being B-2.4.2 and the SSID for the two frequency bands being S-2.4.2 and S-5.2, respectively. For network 130, the group ID is GID 2, with the BSSID of the AP1 interface of repeater D5 being B-2.4.3 and the SSID for the two frequency bands being S-2.4.3 and S-5.3, respectively. In this example, the network weight of a network is the BSSID of the AP1 interface of the root node. In scenario 100, each of repeater D1, D3 and D5 is the root node in networks 110, 120 and 130, respectively. Thus, the network weight of each of networks 110, 120 and 130 is B-2.4.1, B-2.4.2 and B-2.4.3, respectively.

In scenario 100, the APCLI1 interface of repeater D3 attempts to establish a communication link with the AP1 interface of repeater D1, and around the same time the APCLI1 interface of repeater D4 attempts to establish a communication link with the AP1 interface of repeater D5 via group merge mechanism in accordance with the present disclosure. Assuming the number or value of B-2.4.2 (network weight of network 120) is less than the number or value of B-2.4.1 (network weight of network 110), then both repeaters D3 and D4 of network 120 will adopt the configuration of the repeaters of network 110 under the proposed schemes of the present disclosure. Repeater D3 adopts the configuration of network 110 before repeater D4 does as repeater D3 receives the new configuration from repeater D2 while repeater D4 needs to receive the new configuration from repeater D3. Moreover, since the APCLI1 interface of repeater D4 attempts to connect to the AP1 interface of repeater D5, repeater D4 adopts the configuration of the repeaters of network 130 under the proposed schemes of the present disclosure.

When repeater D4 receives a configuration update action frame from repeater D3, repeater D4 needs to drop that configuration update action frame as the group IDs associated with repeater D3 (which remains GID 1) and repeater D4 (which is now GID 2) are different and since group ID update notification is not set in the action frame from repeater D3. Repeater D4, in turn, sends a configuration update action frame to repeater D3 since repeater D4 has adopted the configuration of network 130. When repeater D3 receives the configuration update action frame from repeater D4, repeater D3 needs to process it to adopt the configuration of repeater D4 (and forward from the AP2 interface to the other interfaces of repeater D3 for processing) as the group IDs associated with repeater D3 and D4 are different and that the group ID update notification is set in the action frame from repeater D4. As a result, both of repeaters D3 and D4 will adopt the configuration of repeaters of network 130. Consequently, for network 120, the network weight will be B-2.4.3 and the group ID will be GID 2.

In view of the example above, a scheme for merging networks with the same group ID and a scheme for merging networks with different group IDs are provided and summarized below. When merging networks with the same group ID, a proposed scheme involves determining the network weight of a repeater and/or its network. The proposed scheme also involves determining a direction in which configuration is to flow from one network to the other (e.g., from a first network to a second network to be adopted by the second network). The proposed scheme further involves passing on updated configuration between individual repeaters within a given network. When merging networks with different group IDs, a proposed scheme allows connection between two repeaters of two networks with different group IDs. The proposed scheme involves determining a direction in which configuration is to flow from one network to the other. The proposed scheme further involves passing on updated configuration between individual repeaters within a given network. Moreover, a group merge process in accordance with the present disclosure involves an AP interface of a first repeater of one network and a CLI interface of a second repeater of another network. When a single network is formed due to two independent networks merging together, the group ID of the resultant network may be the same as that of the AP interface of the first repeater.

Under the proposed schemes of the present disclosure, the weight of a repeater may include a BSSID or a media access control (MAC) address of the repeater, which is a unique identifier of the repeater. Moreover, the weight of an individual un-configured repeater may be determined based on whether the repeater is a single-band repeater or a dual-band repeater. For a single-band repeater, the weight of the repeater may be the BSSID of its host or access point interface (hereinafter interchangeably referred as the "AP interface"). For a dual-band repeater, the weight of the repeater may include the BSSID of one of its two AP interfaces corresponding to the two frequency bands. In some implementations, the weight of a dual-band repeater may include the BSSID of one of its 2.4 GHz AP interface. Alternatively, in other implementations, the weight of a dual-band repeater may include the BSSID of one of its 5 GHz AP interface.

In some implementations in accordance with the present disclosure, the weight of a repeater may be a seven-byte number with the least significate six bytes corresponding to the MAC address of the repeater (e.g., the MAC address of the single AP interface or one of the two AP interfaces of the repeater). The most significant one byte of the seven-byte number of the weight may be user configurable, and may be set to be any value between 00 and 0F in the hexadecimal number system. Thus, the weight of a user-configured repeater may be in the form of 0F:XX:XX:XX:XX:XX:XX, and the weight of an un-configured repeater or a network of un-configured repeaters may be in the form of 00:XX:XX:XX:XX:XX:XX. Accordingly, when a user-configured repeater connects to a repeater of a network, the network will adopt the configuration of the user-configured repeater, since the number or value of the most significant byte of the user-configured repeater is higher or greater than the number or value of the most significant byte of the un-configured repeater. This way, a network operator may push a new configuration onto a network as a way to modify the configuration of the network.

Under the proposed schemes, when an un-configured repeater joins a network of repeaters, the un-configured repeater adopts the configuration of the network. Accordingly, there is no need to compare the weight of the un-configured repeater and the network weight of the network.

Figure 2:
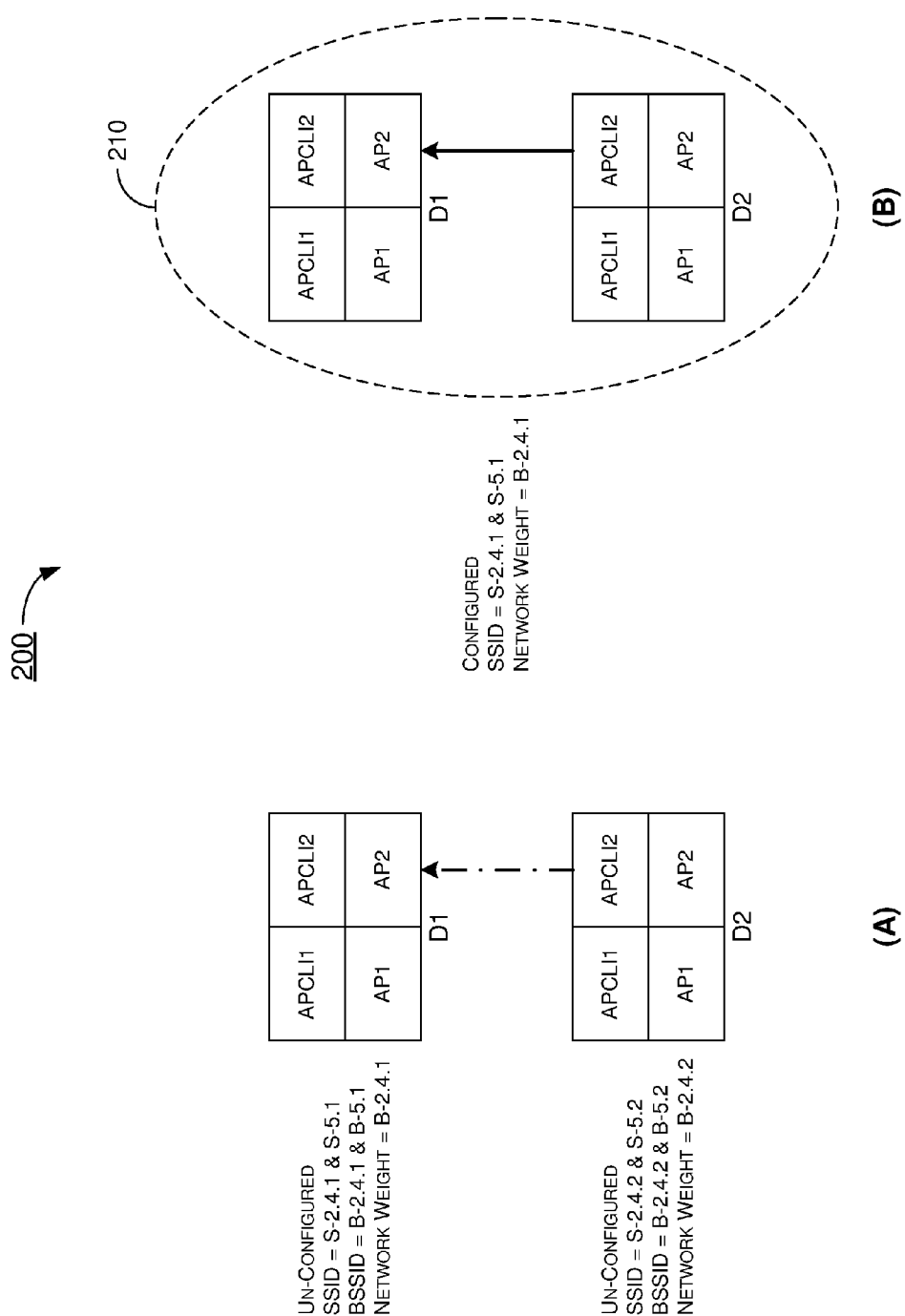
FIG. 2 is a diagram of an example scenario of merging and configuration sharing between repeaters in accordance with an implementation of the present disclosure.

FIG. 2 illustrates an example scenario 200 of merging and configuration sharing between repeaters in accordance with an implementation of the present disclosure. Scenario 200 provides an illustrative example of a proposed scheme for determining the weight for a repeater or network. In part (A) of scenario 200, two dual-band repeaters D1 and D2 are initially un-configured and not connected to each other. Each of repeaters D1 and D2 is capable of wireless communications in the frequency bands of 2.4 GHz and 5 GHz. For repeater D1, the SSIDs for the two frequency bands are S-2.4.1 and S-5.1, respectively, and the BSSIDs for the two frequency bands are B-2.4.1 and B-5.1, respectively. For repeater D2, the SSIDs for the two frequency bands are S-2.4.2 and S-5.2, respectively, and the BSSIDs for the two frequency bands are B-2.4.2 and B-5.2, respectively. In the example shown in FIG. 2, each of repeaters D1 and D2 is un-configured, and the weight of repeater D1 is the BSSID for its 2.4 GHz frequency band (B-2.4.1) while the weight of repeater D2 is the BSSID for its 2.4 GHz frequency band (B-2.4.2).

As each of repeaters D1 and D2 is un-configured, when a communication link is to be established between the APCLI2 interface of repeater D2 and the AP2 interface of repeater D1, each of repeaters D1 and D2 compares its weight with the weight of the other repeater. Assuming the number or value of B-2.4.1 is greater than the number of value of B-2.4.2, when a network 210 is formed with repeaters D1 and D2 connected to each other, as shown in part (B) of scenario 200, network 210 is a configured network which adopts the configuration of repeater D1. In some implementations, when an un-configured CLI interface connects to an AP interface (whether configured or un-configured), weight comparison may not be required at all, as the connecting device may directly adopt the configuration of the connected device.

Figure 3:
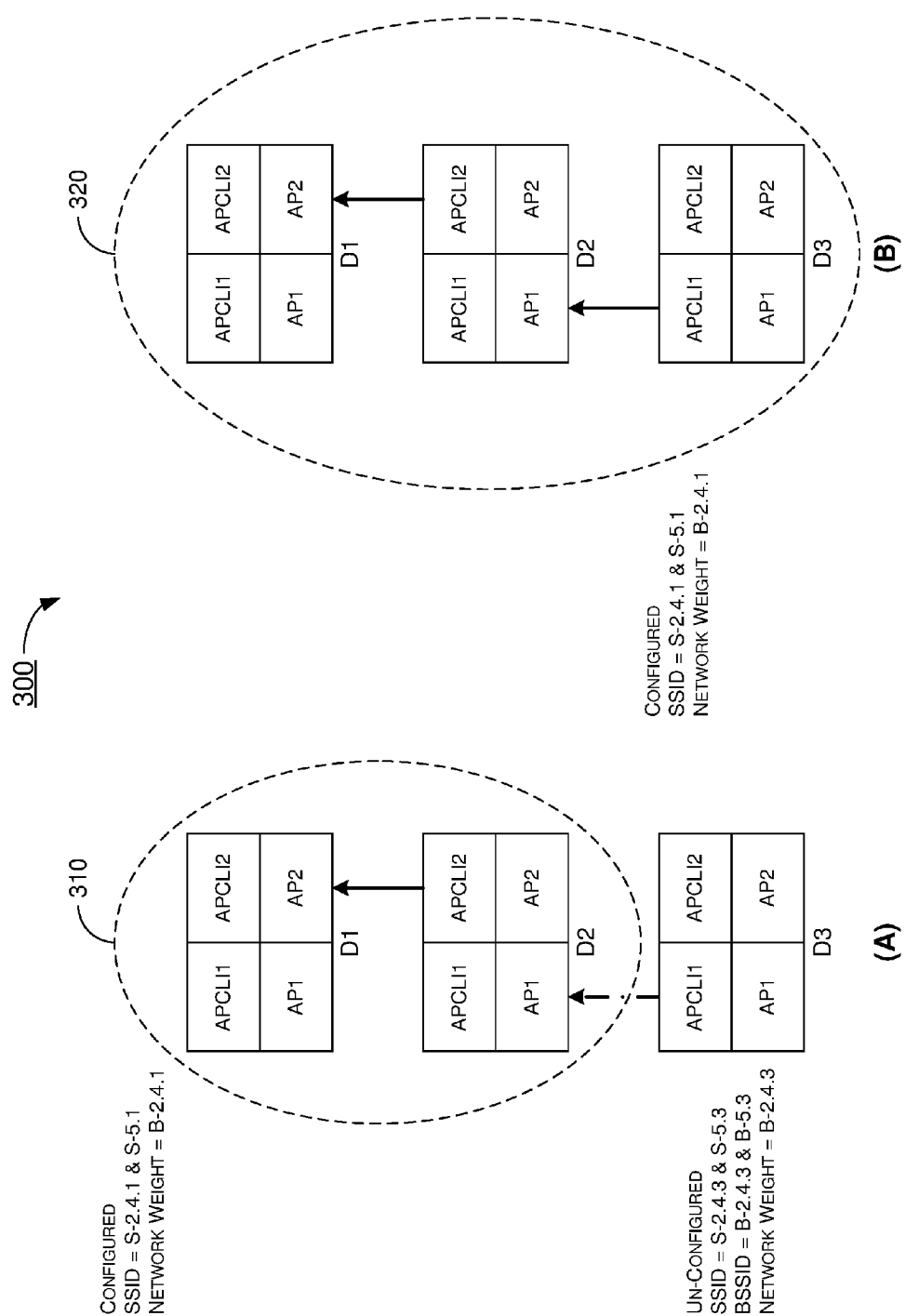
FIG. 3 is a diagram of an example scenario of merging and configuration sharing between repeaters in accordance with another implementation of the present disclosure.

FIG. 3 illustrates an example scenario 300 of merging and configuration sharing between repeaters in accordance with another implementation of the present disclosure. Scenario 300 provides an illustrative example of a proposed scheme for determining the weight for a repeater or network. In part (A) of scenario 300, a repeater network 310 is a configured network of two dual-band repeaters D1 and D2, with SSIDs for the two frequency bands being S-2.4.1 and S-5.1, respectively. The network weight of network 310 is the BSSID of repeater D1, which is B-2.4.1.

In scenario 300, repeater D3 is an un-configured dual-band repeater. The SSIDs for the two frequency bands are S-2.4.3 and S-5.3, respectively, and the BSSIDs for the two frequency bands are B-2.4.3 and B-5.3, respectively. The weight of repeater D3 is the BSSID of the 2.4 GHz band, which is B-2.4.3.

When a communication link is established between repeater D3 and repeater D2 (e.g., between the APCLI1 interface of repeater D3 and the AP1 interface of repeater D2), there is no need to compare the weight of repeater D3 and the network weight of network 310. That is, since repeater D3 is un-configured, repeater D3 will adopt the configuration of network 310 when repeater D3 is connected to repeater D2, as shown in part (B) of scenario 300.

Figure 4:
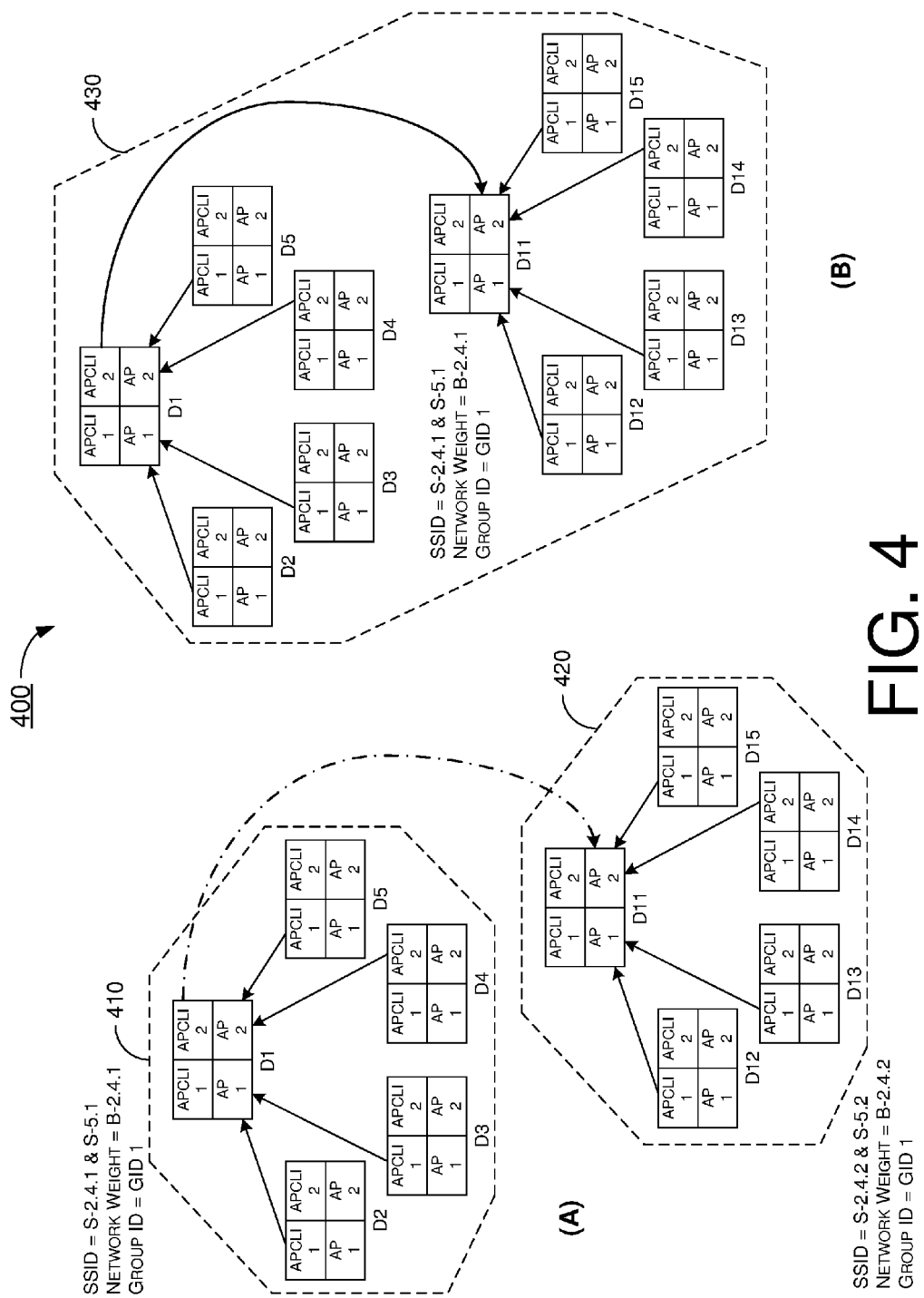
FIG. 4 is a diagram of an example scenario of merging and configuration sharing between repeater networks in accordance with an implementation of the present disclosure.

FIG. 4 illustrates an example scenario 400 of merging and configuration sharing between repeater networks in accordance with an implementation of the present disclosure. Scenario 400 provides an illustrative example of a proposed scheme for determining the weight for a repeater or network. In part (A) of scenario 400, two independent repeater networks 410 and 420 are to merge into one combined network. Network 410 includes dual-band repeaters D1, D2, D3, D4 and D5, with the SSIDs for the two frequency bands being S-2.4.1 and S-5.1, respectively, and the network weight being B-2.4.1. Network 420 includes dual-band repeaters D11, D12, D13, D14 and D15, with the SSIDs for the two frequency bands being S-2.4.2 and S-5.2, respectively, and the network weight being B-2.4.2. In this example, both network 410 and network 420 have the same group ID, which is GID 1. Thus, when network 410 and network 420 merge into a combined network 430, the overall network weight of network 430 will be the higher network weight between the network weight of network 410 and the network weight of network 420. Assuming the number or value of B-2.4.1 is greater than the number or value of B-2.4.2, the network weight of network 430 will be B-2.4.1, as shown in part (B) of scenario 400. That is, all repeaters in network 430, including repeaters D1, D2, D3, D4, D5, D11, D12, D13, D14 and D15, will have the same network weight of B-2.4.1 in this example.

Figure 5:
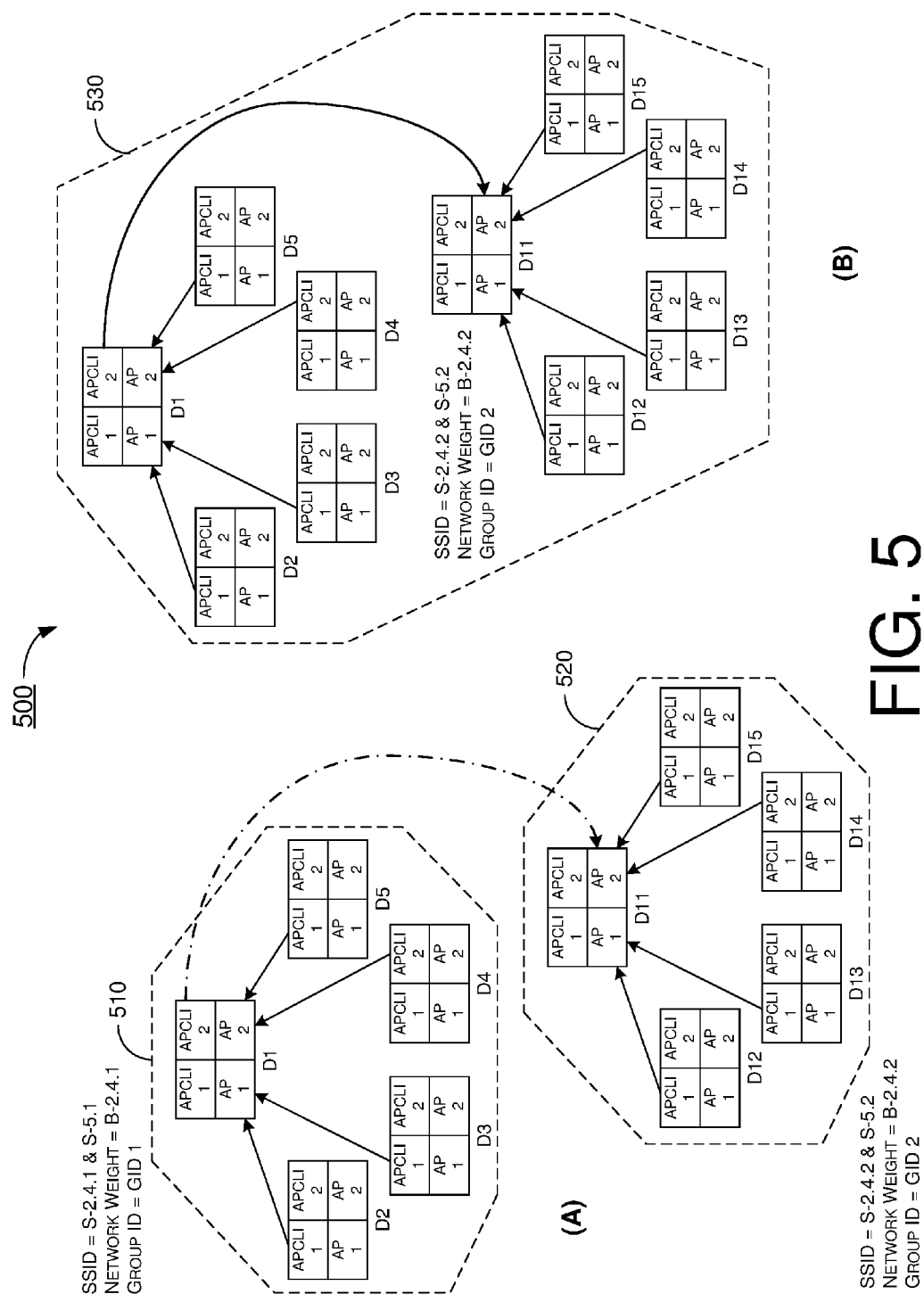
FIG. 5 is a diagram of an example scenario of merging and configuration sharing between repeater networks in accordance with another implementation of the present disclosure.

FIG. 5 illustrates an example scenario 500 of merging and configuration sharing between repeater networks in accordance with another implementation of the present disclosure. Scenario 500 provides an illustrative example of a proposed scheme for determining the weight for a repeater or network. In part (A) of scenario 500, two independent repeater networks 510 and 520 are to merge into one combined network. Network 510 includes dual-band repeaters D1, D2, D3, D4 and D5, with the SSIDs for the two frequency bands being S-2.4.1 and S-5.1, respectively, and the network weight being B-2.4.1. Network 520 includes dual-band repeaters D11, D12, D13, D14 and D15, with the SSIDs for the two frequency bands being S-2.4.2 and S-5.2, respectively, and the network weight being B-2.4.2. In this example, network 510 has a group ID of GID 1 and network 520 have a group ID of GID 2. Thus, when network 510 and network 520 merge into a combined network 530, the overall network weight of network 530 will be the weight of the AP interface of the repeater of one of the networks 510 and 520 to which the CLI interface of the repeater of the other of networks 510 and 520 is connected. In the example shown in FIG. 5, as the APCLI2 interface of device D1 of network 510 is connected to the AP2 interface of device D11 of network 520, the direction of configuration flow will be from network 520 to network 510. Thus, the network weight of the overall network 530 will be the weight of the AP2 interface of device D11, which is B-2.4.2, as shown in part (B) of scenario 500. That is, all repeaters in network 530, including repeaters D1, D2, D3, D4, D5, D11, D12, D13, D14 and D15, will have the same network weight of B-2.4.2 and group ID is GID 2 in this example.

Under a proposed scheme of the present disclosure, a repeater may introduce or push an updated configuration onto individual repeaters in a network. In some implementations, an action frame may be utilized by a repeater to trigger or push for configuration update on peer repeaters in the network. Accordingly, configuration parameters such as, for example and without limitation, SSIDs, PMKs and channels, may be shared among repeaters of a given network. In some implementations, configuration update may be trigger by a repeater acting as an access point (AP) when a configured repeater acting as a client (CLI) with a higher network weight is connected to the repeater acting as an AP. In some implementations, configuration update may be triggered by a repeater acting as a CLI when that repeater is connected to a repeater acting as an AP with a higher network weight. Moreover, configuration update may be triggered by a repeater acting as a CLI when that repeater is connected to a repeater acting as an AP with a different group ID. In some implementations, an interface (whether AP interface or CLI interface) on a repeater may adopt and forward a new configuration in an event that a received action frame announces or otherwise indicates a network weight higher than that of the repeater. In some implementations, an interface (whether AP interface or CLI interface) on a repeater may adopt and forward a new configuration in an event that a received action frame announces or otherwise indicates a group ID update to trigger an update of the group ID of the repeater.

Under a proposed scheme of the present disclosure, when an AP interface of a dual-band repeater triggers a configuration update "push" or receives an action frame for configuration update, the AP interface may carry out a number of acts. For instance, the AP interface may inform other interfaces on the same repeater (such as the AP interface of the other frequency band and the two CLI interfaces). Additionally, the AP interface may send an action frame for configuration update to all CLI interface(s) of repeater(s) that are connected to this AP interface. Moreover, the AP interface may update its own configuration. Furthermore, the AP interface may disconnect from one or more of its peer repeaters in the same network to which it is connected.

In some implementations, when the AP interface (for ease of reference, hereinafter referred as "AP1") of a dual-band repeater informs other interfaces on the same repeater about the configuration update, the other AP interface on the repeater (for ease of reference, hereinafter referred as "AP2") may correspondingly send an action frame for configuration update to all CLI interface(s) of repeater(s) that are connected to that AP interface. Additionally, the AP2 interface may update its own configuration, and may disconnect from one or more of its peer repeaters in the same network to which it is connected. Moreover, each of the two CLI interfaces on the repeater may send a respective action frame for configuration update to the respective AP interface on another repeater to which it is connected. Furthermore, each of the two CLI interfaces may disconnect from the respective AP interface on another repeater to which it is connected, and may attempt to establish new communication link with the new configuration.

Under a proposed scheme of the present disclosure, for two networks with different group IDs to connect to each other, a trigger from a user (e.g., network operator) may be required. Specifically, a separate triggering command from the user for each of the connecting AP interface of a repeater of one of the two networks and the connecting CLI interface of a repeater of the other of the two networks may be required. When the AP interface receives the triggering command from the user, the AP interface may set open merge capability in beacon(s), probe request(s) and/or probe response(s) (e.g., in vendor-specific information elements (IE)) sent out by the AP interface to announce its open merge capability. Additionally, the AP interface may allow connection from a CLI interface of a repeater of the other network which supports open merge capability in the probe request(s). When the CLI interface receives the triggering command from the user, the CLI interface may set open merge capability in the probe request(s) that it sends out. The CLI interface may also identify AP interfaces that are capable of open merge. In an event that more than one AP interface with open merge capability are found, the CLI interface may not initiate connection with any of such AP interfaces. In an event that one AP interface, and no more, with open merge capability is found, the CLI interface may initiate connection with that AP interface. Upon a communication link is established to connect the CLI interface with an AP interface, the CLI interface may adopt the group ID and other parameters of the configuration of the connecting AP interface, and may also forward the newly-adopted configuration to other interfaces of the repeater. Correspondingly, the other interfaces of the repeater may adopt the new configuration as well as forward the new configuration to connected peers. Accordingly, the configuration of one network can thus be adopted by the other network when these two networks with different group IDs are merged into one network.

Figure 6:
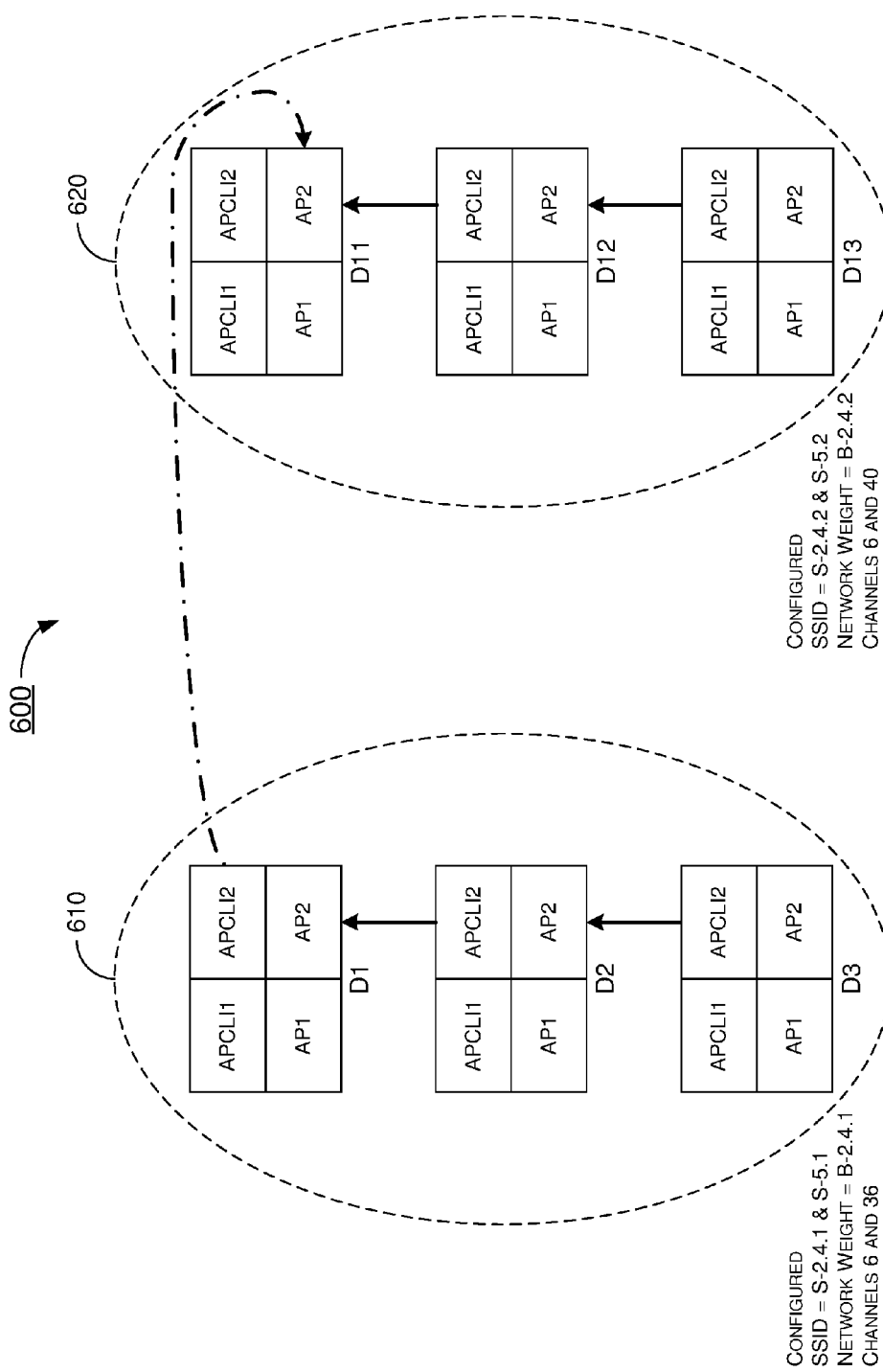
FIG. 6 is a diagram of an example scenario of merging and configuration sharing between repeater networks in accordance with another implementation of the present disclosure.

FIG. 6 illustrates an example scenario 600 of merging and configuration sharing between repeater networks in accordance with another implementation of the present disclosure. Scenario 600 provides an illustrative example of a proposed scheme on connecting two independent networks of dual-band repeaters on different channels. Under the proposed scheme, before a CLI interface triggers a channel scan, its associated AP interface of the same frequency band on the same repeater may send out an action frame to connected peer(s) to announce its unavailability, and, correspondingly, the CLI interface(s) of connected repeater(s) may refrain from disconnection during this period of time. In an event that the scanning CLI interface is connected to an AP interface of another repeater on a different channel and adopts the configuration of that AP interface, the CLI interface may send a powersave enable frame to its associated AP interface of the same frequency band on the same repeater so as to enter into a powersave mode. Accordingly, the repeater may switch to the channel of its own AP interface. The CLI interface may forward its newly-adopted configuration to other interfaces of the same repeater, and the AP interfaces of the repeater may send out action frames for configuration update to their peers and then disconnect from them. Subsequently, the AP and CLI interfaces of the repeater may switch to the new channel of the connecting AP interface of the other repeater, and may exit from the powersave mode.

In scenario 600, each of the independent repeater networks 610 and 620 includes a number of repeaters. As shown in FIG. 6, network 610 includes repeaters D1, D2 and D3, and network 620 includes repeaters D11, D12 and D13. Each of the repeaters D1, D2, D3, D11, D12 and D12 is capable of dual-band communications over two frequency bands. In network 610, repeaters D1 and D2 are connected via the AP2 interface of repeater D1 and the APCLI2 interface of repeater D2, and repeaters D2 and D3 are connected via the AP2 interface of repeater D2 and the APCLI2 interface of repeater D3. In network 620, repeaters D11 and D12 are connected via the AP2 interface of repeater D11 and the APCLI2 interface of repeater D12, and repeaters D12 and D13 are connected via the AP2 interface of repeater D12 and the APCLI2 interface of repeater D13. Communications among repeaters D1, D2 and D3 of network 610 may be on first and second channels (e.g., channel 6 and channel 36), and communications among repeaters D11, D12 and D13 of network 620 may be on first and third channels (e.g., channel 6 and channel 40).

In the example shown in FIG. 6, the AP2 interface of repeater D1 of network 610 may send out an action frame to its connected peer, the APCLI2 interface of repeater D2, to announce its unavailability before the APCLI2 interface of repeater D1 triggers a channel scan. As a result of the channel scan, the APCLI2 interface of repeater D1 may connect to the AP2 interface of repeater D11 of network 620 and adopt the configuration thereof. Correspondingly, the APCLI2 interface of repeater D1 may send a powersave enable frame to the AP2 interface of repeater D1 to enter into a powersave mode. Repeater D1 may switch to the channel of the AP2 interface (e.g., channel 6 or channel 36). The APCLI2 interface of repeater D1 may forward its newly-adopted configuration to other interfaces of the same repeater, namely the AP2, APCLI1 and AP1 interfaces. The AP1 and AP2 interfaces of repeater D1 may send out action frames for configuration update to their peers (the APCLI2 interface of repeater D2 in the example shown in FIG. 6) and then disconnect from them. Subsequently, the AP1, AP2, APCLI1 and APCLI2 interfaces of repeater D1 may switch to the channel of the AP interface of repeater D11 (e.g., channel 40), and may exit from the powersave mode. Accordingly, the two networks 610 and 620, which may be on different channels originally, may be connected to each other via the communication link between the APCLI2 interface of repeater D1 and the AP2 interface of repeater D11.

Under a proposed scheme of the present disclosure, user configuration may be saved for fast network stabilization. Once a repeater identifies its weight as 0F:XX:XX:XX:XX:XX, the repeater may store its configuration and, at the next boot-up, the repeater may use the stored configuration. Since all repeaters of a given network use the same configuration, no more configuration push needs to happen and a stable network may be formed. In an event that a user desires to update the configuration on one of the repeaters, a new configuration update may be triggered with a revised configuration version ID. When a repeater receives configuration update with a higher configuration version ID, the repeater may adopt and save the new configuration.

Illustrative Implementations

Figure 7:
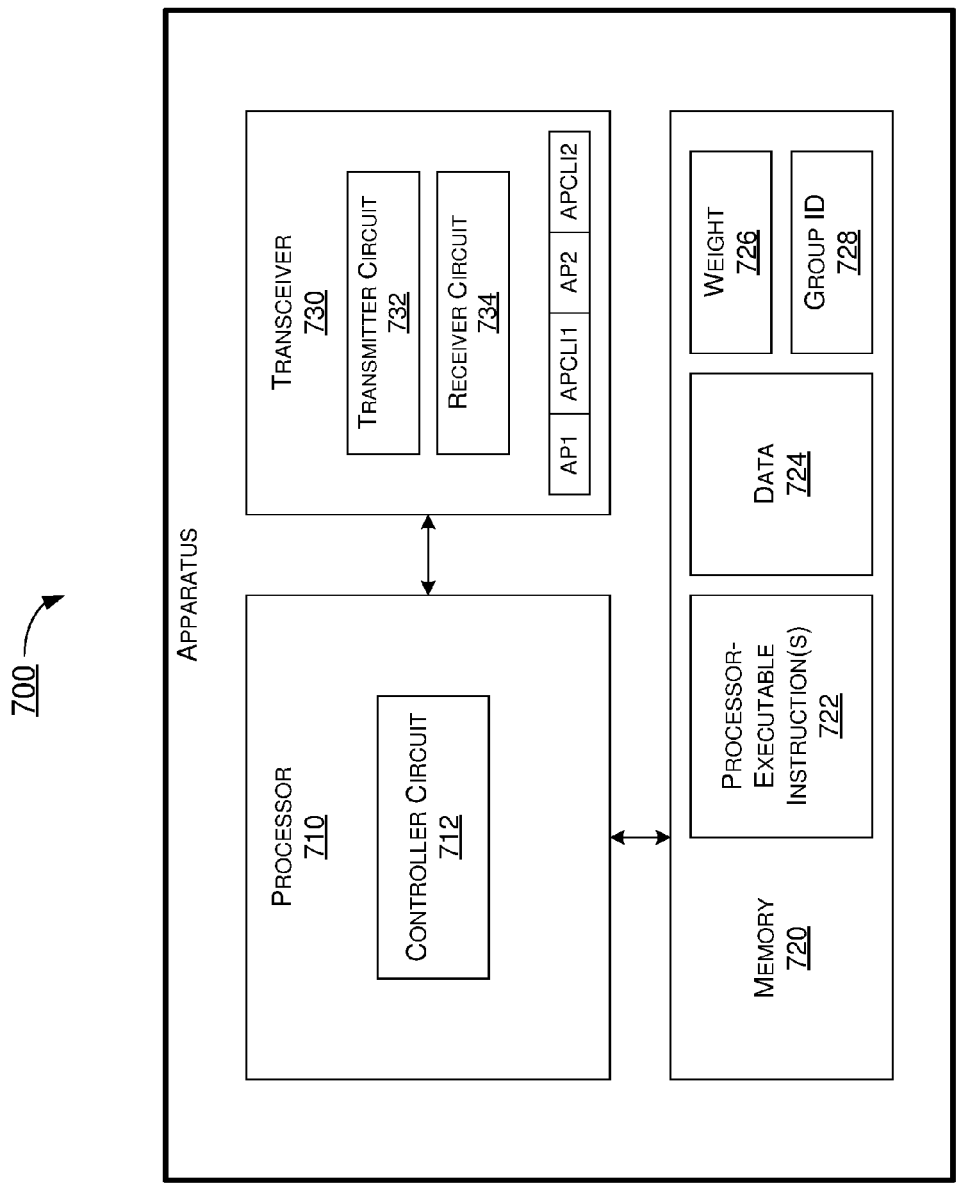
FIG. 7 is a block diagram of an example apparatus in accordance with an implementation of the present disclosure.

FIG. 7 illustrates an example apparatus 700 in accordance with an implementation of the present disclosure. Apparatus 700 may perform various functions to implement schemes, techniques, processes and methods described herein pertaining to loop detection in dual-band repeater networks, including scenarios 100, 200, 300, 400, 500 and 600 described above as well as processes 800 and 900 described below. Apparatus 700 may be a part of an electronic apparatus which may be a communication device, a computing apparatus, a portable or mobile apparatus, or a wearable apparatus. For instance, apparatus 700 may be implemented in a repeater, a Wi-Fi access point, a smartphone, a smartwatch, a smart bracelet, a smart necklace, a personal digital assistant, or a computing device such as a tablet computer, a laptop computer, a notebook computer, a desktop computer, or a server. Alternatively, apparatus 700 may be implemented in the form of one or more integrated-circuit (IC) chips such as, for example and not limited to, one or more single-core processors, one or more multi-core processors, or one or more complex-instruction-set-computing (CISC) processors. Apparatus 700 may include at least some of those components shown in FIG. 7, such as a processor 710 and a memory 720. Additionally, apparatus 700 may include a transceiver 730 configured to transmit and receive data wirelessly (e.g., in compliance with the IEEE 802.11 specification and/or any applicable wireless protocols and standards).

Transceiver 730 may be configured to communicate wirelessly in a single frequency band or in two frequency bands, such as a first frequency band and a second frequency band. That is, transceiver 730 may be a dual-band communication device capable of communications over two frequency bands (e.g., 2.4 GHz and 5 GHz). Moreover, transceiver 730 may function as a host, access point or repeater_AP in both of the two frequency bands (via host interfaces labeled as "AP1" and "AP2" in FIG. 7). Moreover, transceiver 730 may function as a client, station or repeater_STA in both of the two frequency bands (via client interfaces labeled as "APCLI1" and "APCLI2" in FIG. 7). Transceiver 730 may include a transmitter circuit 732 and a receiver circuit 734. Transmitter circuit 732 may include hardware (e.g., electronic components) that are configured to transmit wireless signals over a single frequency band or two frequency bands. Receiver circuit 732 may include hardware (e.g., electronic components) that are configured to receive wireless signals over a single frequency band or two frequency bands.

Memory 720 may be a storage device configured to store one or more sets of codes, programs and/or instructions 722 that are executable by processor 710. Memory 720 may also be configured to store data 724 as well as device-specific information such as weight 726 and group ID 728. For example, memory 720 may be operatively coupled to processor 710 to receive data 724, such as configuration data (e.g., BSSID, PMK, channels and other configuration parameters) of one or more other communication devices, to store therein. When apparatus 700 is implemented in or as a first communication device such as a first repeater, memory 720 may store a respective first weight of the first communication device as weight 726 (and optionally a group ID as group ID 728. Memory 720 may be implemented by any suitable technology and may include volatile memory and/or non-volatile memory. For example, memory 720 may include a type of random access memory (RAM) such as dynamic RAM (DRAM), static RAM (SRAM), thyristor RAM (T-RAM) and/or zero-capacitor RAM (Z-RAM). Alternatively or additionally, memory 720 may include a type of read-only memory (ROM) such as mask ROM, programmable ROM (PROM), erasable programmable ROM (EPROM) and/or electrically erasable programmable ROM (EEPROM). Alternatively or additionally, memory 720 may include a type of non-volatile random-access memory (NVRAM) such as flash memory, solid-state memory, ferroelectric RAM (FeRAM), magnetoresistive RAM (MRAM) and/or phase-change memory.

Processor 710 may be implemented in the form of one or more single-core processors, one or more multi-core processors, or one or more CISC processors. That is, processor 710 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure.

Processor 710 may access memory 720 to execute the one or more instructions stored in memory 720. Upon executing the one or more sets of instructions, processor 710 may be configured to perform operations pertaining to merging and configuration sharing for repeater networks in accordance with the present disclosure. For instance, processor 710 may, via transceiver 730, establishing a communication link with a second communication device to connect to the second communication device, with the first communication device being associated with a first weight and/or a first group identifier, and with the second communication device being associated with a second weight and/or a second group identifier. Additionally, processor 710 may determine whether the first group identifier and the second group identifier are identical. In response to a determination that the first group identifier and the second group identifier are identical, processor 710 may determine which of the first weight and the second weight is higher. Moreover, processor 710 may perform one or more of the following: (1) in response to a determination that the second weight is higher than the first weight, adopting a configuration of the second communication device by receiving data related to the configuration of the second communication device from the second communication device; (2) in response to a determination that the first weight is higher than the second weight, transmitting data related to a configuration of the first communication device to the second communication device such that the second communication device adopts the configuration of the first communication device; and (3) in response to a determination that the second communication device is not associated with any group identifier (e.g., the second communication device may be un-configured), transmitting the data related to a configuration of the first communication device to the second communication device such that the second communication device adopts the first group identifier and the configuration of the first communication device.

In some implementations, transceiver 730 may be a single-band communication transceiver configured to communicate over a single frequency band, and the first weight may include a unique identifier associated with a host interface of the first communication device (e.g., BSSID or MAC address of an AP interface of transceiver 730). Alternatively, transceiver 730 may be a dual-band communication device configured to communicate over two frequency bands, and the first weight may include a unique identifier associated with a host interface of the first communication device for one of the two frequency bands (e.g., BSSID or MAC address of one of the two AP interfaces of transceiver 730).

In some implementations, in adopting the configuration of the second communication device, processor 710 may adopt the configuration of the second communication device at each host interface and each client interface for each frequency band over which transceiver 730 is configured to communication wirelessly.

In some implementations, in response to a determination that the second weight is higher than the first weight, processor 710 may transmit, via transceiver 730, the data related to the configuration of the second communication device to a third communication device that is connected to the first communication device such that the third communication device adopts the configuration of the second communication device. In some implementations, in determining which of the first weight and the second weight is higher, processor 710 may receive a first action from the second communication device indicating the second weight which is higher than the first weight. Moreover, in transmitting the data related to the configuration of the second communication device to the third communication device, processor 710 may transmit, via transceiver 730, a second action frame to the third communication device to trigger the third communication device to adopt the configuration of the second communication device.

In some implementations, in response to a determination that the first group identifier and the second group identifier are not identical, processor 710 may perform either of the following: (1) in an event that the communication link is between a client interface of the first communication device and a host interface of the second communication device, adopting the configuration of the second communication device by receiving the data related to the configuration of the second communication device from the second communication device; or (2) in an event that the communication link is between a host interface of the first communication device and a client interface of the second communication device, transmitting, via transceiver 730, the data related to a configuration of the first communication device to the second communication device such that the second communication device adopts the configuration of the first communication device. In some implementations, in transmitting the data related to the configuration of the first communication device to the second communication device, processor 710 may transmit, via transceiver 730, an action frame to the second communication device to trigger a group identifier update from the second group identifier to the first group identifier for the second communication device. Moreover, in an event that the communication link is between the client interface of the first communication device and the host interface of the second communication device, processor 710 may transmit, via transceiver 730, the data related to the configuration of the second communication device to a third communication device that is connected to the first communication device such that the third communication device adopts the configuration of the second communication device.

In some implementations, processor 710 may scan, via transceiver 730, wireless communication channels to identify one or more other communication devices. In response to identifying a second communication device which communicates on a channel different from a channel on which the first communication device communicates, processor 710 may establish, via transceiver 730, a communication link with the second communication device to connect to the second communication device. Processor 710 may also adopt a configuration of the second communication device.

In some implementations, prior to the scanning, processor 710 may transmit, via a host interface of transceiver 730, an action frame to a third communication device which is connected to the first communication device via the host interface. The action frame may indicate a time frame during which the host interface is unavailable, and the scanning may be done by a client interface of transceiver 730.

Additionally, processor 710 may transmit, via the client interface of transceiver 730, a powersave enable frame to the host interface of transceiver 730 to enter into a powersave mode. Moreover, processor 710 may transmit, by the host interface of transceiver 730, another action frame to the third communication device to trigger a configuration update at the third communication device. Processor 710 may disconnect, via the host interface of transceiver 730, a communication link with the third communication device. Furthermore, processor 710 may switch, by the host interface and the client interface of transceiver 730, to communicate on the channel on which the second communication device communicates.

Figure 8:
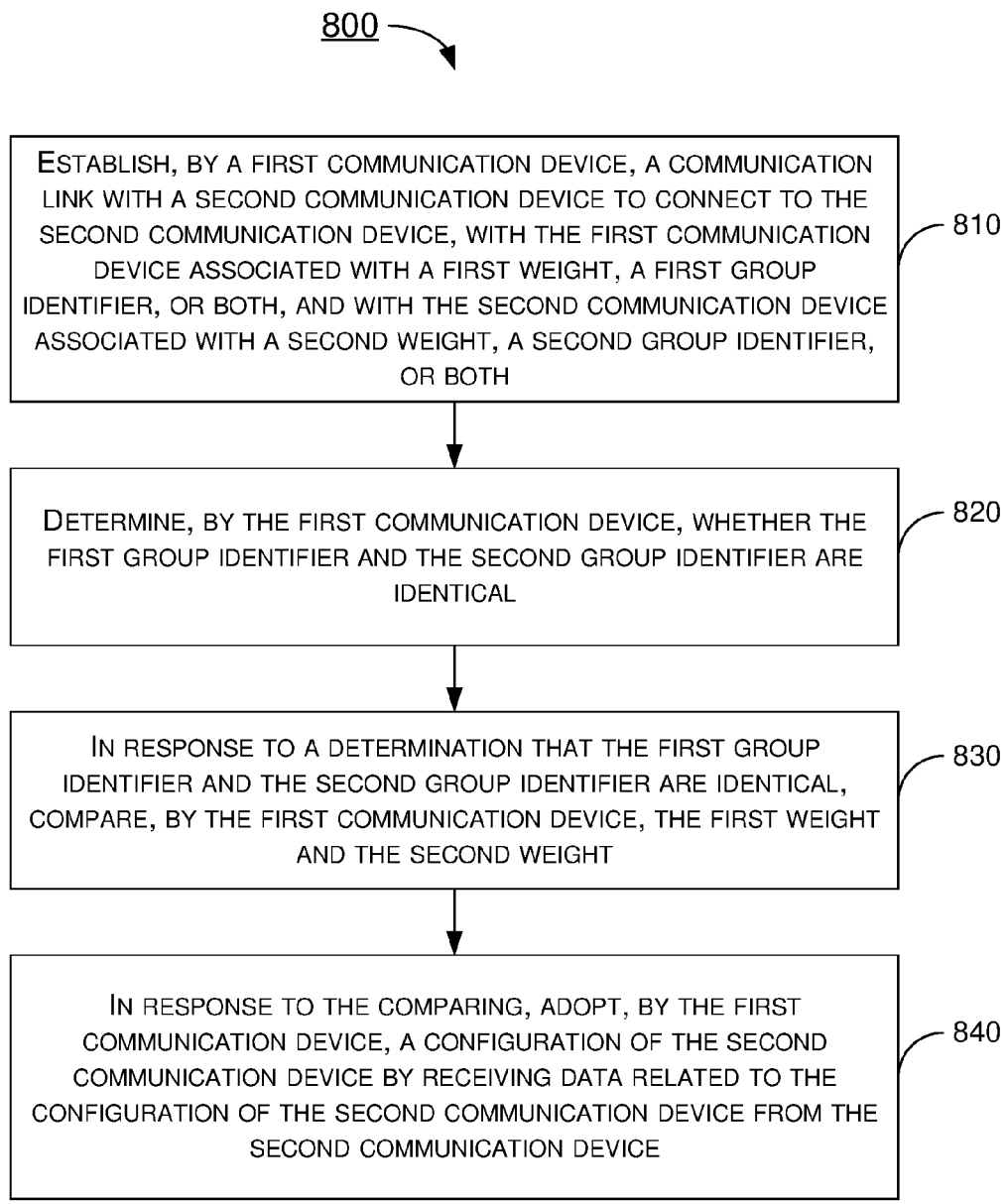
FIG. 8 is a flowchart of an example process in accordance with an implementation of the present disclosure.

FIG. 8 illustrates an example process 800 in accordance with an implementation of the present disclosure. Process 800 may represent an aspect of implementing features of apparatus 700. Process 800 may include one or more operations, actions, or functions as illustrated by one or more of blocks 810, 820, 830 and 840. Although illustrated as discrete blocks, various blocks of process 800 may be divided into additional blocks, combined into fewer blocks, or eliminated, depending on the desired implementation. Moreover, the blocks/sub-blocks of process 800 may executed in the order shown in FIG. 8 or, alternatively in a different order. Process 800 may be implemented by apparatus 700 and any variations thereof. For instance, process 800 may be implemented in and by one or more of the communication devices, nodes or repeaters shown in scenarios 100, 200, 300, 400, 500 and 600. Solely for illustrative purposes, process 800 is described below in the context of apparatus 700 being a first communication device (e.g., first repeater) of a plurality of communication devices (e.g., multiple repeaters). Process 800 may begin at block 810.

At 810, process 800 may involve processor 710 of apparatus 700 (as a first communication device) establishing, via transceiver 730, a communication link with a second communication device to connect to the second communication device. The first communication device may be associated with a first weight and/or a first group identifier. The second communication device may be associated with a second weight and/or a second group identifier. Process 800 may proceed from 810 to 820.

At 820, process 800 may involve processor 710 of apparatus 700 determining whether the first group identifier and the second group identifier are identical. Process 800 may proceed from 820 to 830.

At 830, process 800 may involve processor 710 of apparatus 700 comparing, by the first communication device, the first weight and the second weight in response to a determination that the first group identifier and the second group identifier are identical. Process 800 may proceed from 830 to 840.

At 840, process 800 may involve processor 710 of apparatus 700, responsive to the comparing, adopting a configuration of the second communication device by receiving data related to the configuration of the second communication device from the second communication device. For instance, when the comparing indicates that the second weight is higher than the first weight, apparatus 700 (as the first communication device) may adopt the configuration of the second communication device. Similarly, when the comparing indicates that the first weight is higher than the second weight, process 800 may involve processor 710 of apparatus 700 transmitting, via transceiver 730, data related to a configuration of apparatus 700 to the second communication device such that the second communication device adopts the configuration of apparatus 700. In some implementations, the first communication device may be a single-band communication device configured to communicate over a single frequency band, and the first weight may include a unique identifier associated with a host interface of the first communication device. For example and without limitation, the unique identifier may be a BSSID or a MAC address of an AP interface of the first communication device (e.g., that of transceiver 730). Alternatively, the first communication device may be a dual-band communication device configured to communicate over two frequency bands, and the first weight may include a unique identifier associated with a host interface of the first communication device for one of the two frequency bands.

In some implementations, in response to a determination that the second communication device is not associated with any group identifier, process 800 may involve processor 710 transmitting, via transceiver 730, the data related to a configuration of the first communication device to the second communication device such that the second communication device adopts the first group identifier and the configuration of the first communication device.

In some implementations, in adopting the configuration of the second communication device, process 800 may involve processor 710 adopting the configuration of the second communication device at each host interface and each client interface for each frequency band over which the first communication device is configured to communication wirelessly.

In some implementations, in response to a determination that the second weight is higher than the first weight, process 800 may further involve processor 710 transmitting, via transceiver 730, the data related to the configuration of the second communication device to a third communication device that is connected to the first communication device such that the third communication device adopts the configuration of the second communication device. In some implementations, in determining which of the first weight and the second weight is higher, process 800 may further involve processor 710 receiving a first action from the second communication device indicating the second weight which is higher than the first weight. Moreover, in transmitting the data related to the configuration of the second communication device to the third communication device, process 800 may further involve processor 710 transmitting, via transceiver 730, a second action frame to the third communication device to trigger the third communication device to adopt the configuration of the second communication device.

In some implementations, in response to a determination that the first group identifier and the second group identifier are not identical, process 800 may further involve processor 710 adopting the configuration of the second communication device by receiving the data related to the configuration of the second communication device from the second communication device, in an event that the communication link is between a client interface of the first communication device and a host interface of the second communication device. Alternatively, in response to a determination that the first group identifier and the second group identifier are not identical, process 800 may involve processor 710 transmitting, via transceiver 730, the data related to a configuration of the first communication device to the second communication device such that the second communication device adopts the configuration of the first communication device, in an event that the communication link is between a host interface of the first communication device and a client interface of the second communication device. In some implementations, in transmitting the data related to the configuration of the first communication device to the second communication device, process 800 may involve processor 710 transmitting, via transceiver 730, an action frame to the second communication device to trigger a group identifier update from the second group identifier to the first group identifier for the second communication device. Moreover, in some implementations, in an event that the communication link is between the client interface of the first communication device and the host interface of the second communication device, process 800 may involve processor 710 transmitting, via transceiver 730, the data related to the configuration of the second communication device to a third communication device that is connected to the first communication device such that the third communication device adopts the configuration of the second communication device.

In some implementations, process 800 may also involve processor 710 of apparatus 700 transmitting, via transceiver 730, to the second communication device a first information element (IE) containing data related to a configuration of apparatus 700 (as the first communication device) upon the establishing of the communication link. Moreover, process 800 may involve processor 710 of apparatus 700 receiving, via transceiver 730, from the second communication device a second IE containing data related to the configuration of the second communication device upon the establishing of the communication link. Furthermore, process 800 may involve processor 710 of apparatus 700 forwarding, via transceiver 730, the data related to the configuration of the second communication device to one or more other peer communication devices.

In some implementations, process 800 may also involve processor 710 of apparatus 700 announcing, via transceiver 730, an open merge capability in one or more beacons, one or more probe requests, or one or more probe responses indicating the open merge capability of apparatus 700 (as the first communication device).

Figure 9:
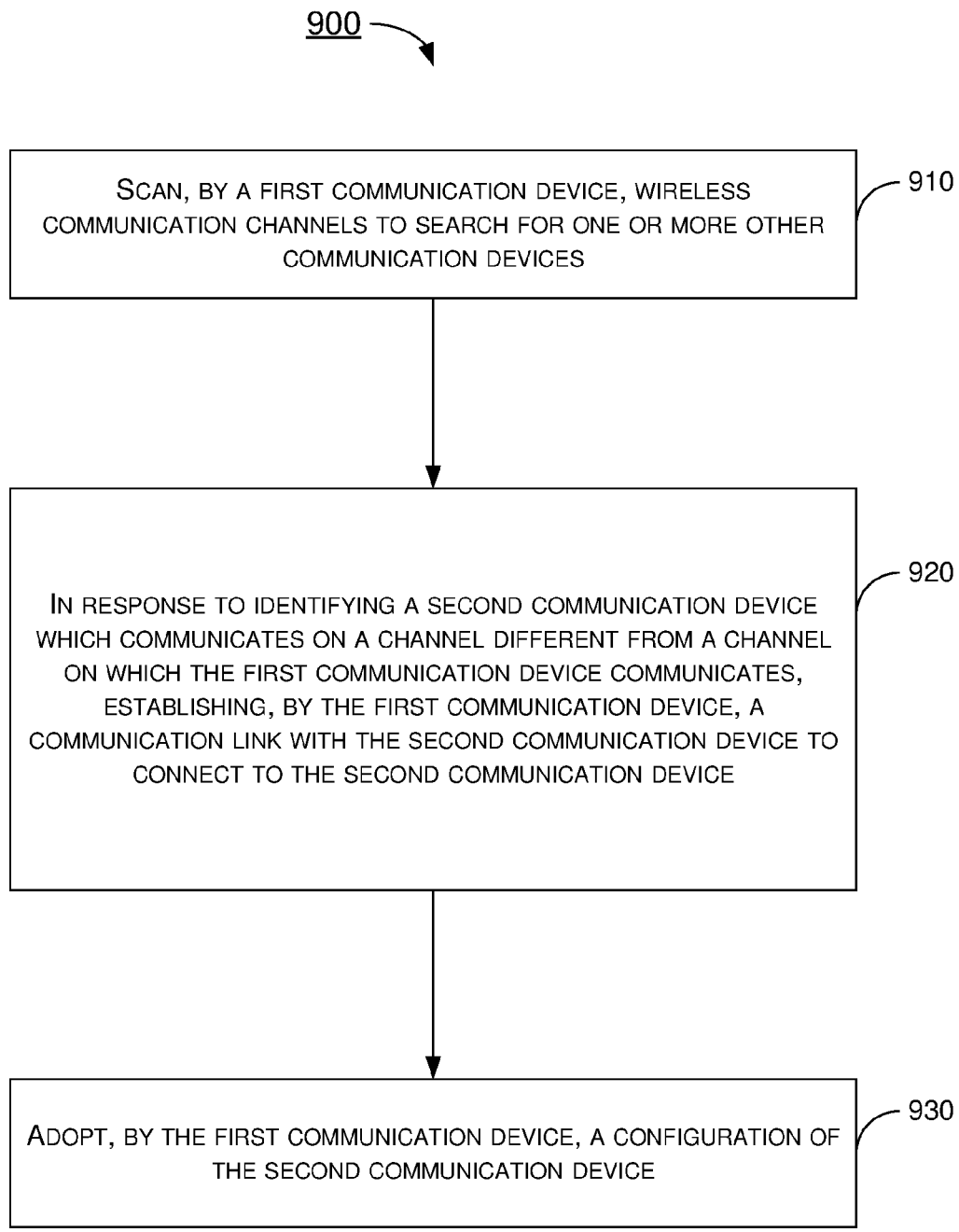
FIG. 9 is a flowchart of an example process in accordance with another implementation of the present disclosure.
Figure 10:
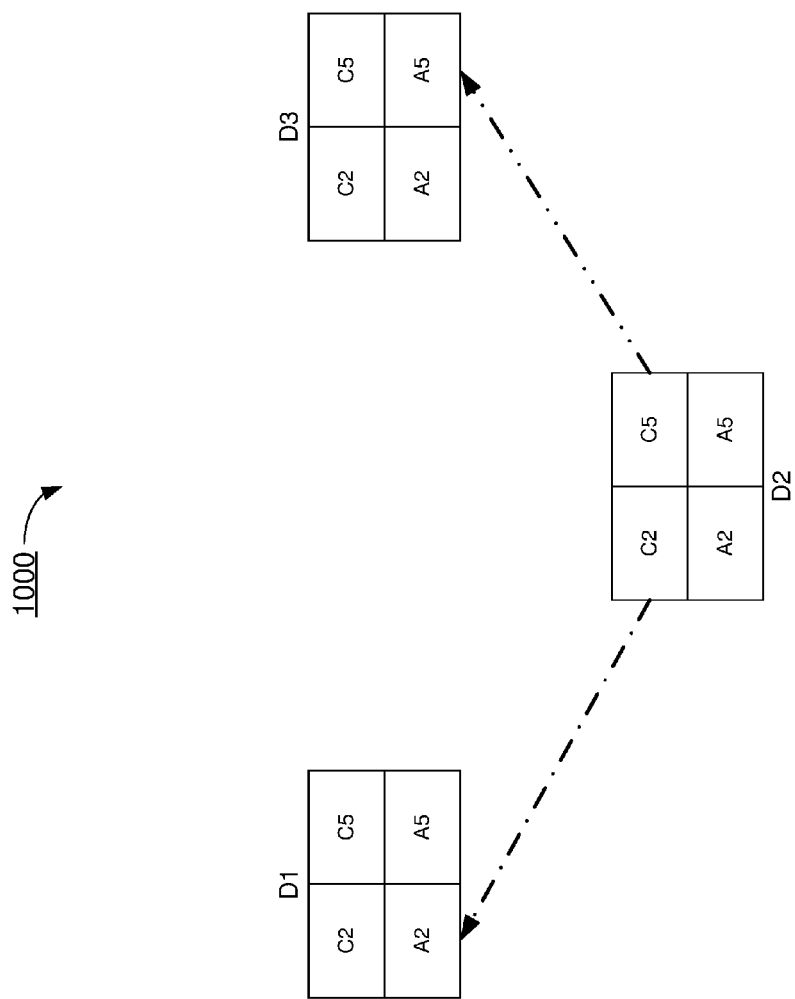
FIG. 10 is a diagram of an example scenario under an existing approach.

FIG. 9 illustrates an example process 900 in accordance with an implementation of the present disclosure. Process 900 may represent an aspect of implementing features of apparatus 700. Process 900 may include one or more operations, actions, or functions as illustrated by one or more of blocks 910, 920 and 930. Although illustrated as discrete blocks, various blocks of process 900 may be divided into additional blocks, combined into fewer blocks, or eliminated, depending on the desired implementation. Moreover, the blocks/sub-blocks of process 900 may executed in the order shown in FIG. 9 or, alternatively in a different order. Process 900 may be implemented by apparatus 700 and any variations thereof. For instance, process 900 may be implemented in and by one or more of the communication devices, nodes or repeaters shown in scenarios 100, 200, 300, 400, 500 and 600. Solely for illustrative purposes, process 900 is described below in the context of apparatus 700 being a first communication device (e.g., first repeater) of a plurality of communication devices (e.g., multiple repeaters) and having a first node number. Process 900 may begin at block 910.

At 910, process 900 may involve processor 710 of apparatus 700 scanning, via transceiver 730, wireless communication channels to identify one or more other communication devices. Process 900 may proceed from 910 to 920.

At 920, in response to identifying a second communication device which communicates on a channel different from a channel on which the first communication device communicates, process 900 may involve processor 710 of apparatus 700 establishing, via transceiver 730, a communication link with the second communication device to connect to the second communication device. Process 900 may proceed from 920 to 930.

At 930, process 900 may involve processor 710 of apparatus 700 adopting a configuration of the second communication device.

In some implementations, prior to the scanning, process 900 may involve processor 710 transmitting, via a host interface of one or more host interfaces of transceiver 730, an action frame to a third communication device which is connected to the first communication device via the host interface. The action frame may indicate a time frame during which the host interface is unavailable. The scanning may include scanning by a client interface of one or more client interfaces of the first communication device.

In some implementations, process 900 may further involve processor 710 transmitting, via the client interface of transceiver 730, a powersave enable frame to the host interface of the first communication device to enter into a powersave mode. Additionally, process 900 may involve processor 710 transmitting, via the host interface of transceiver 730, another action frame to the third communication device to trigger a configuration update at the third communication device. Moreover, process 900 may involve processor 710 disconnecting, by the host interface of transceiver 730, a communication link with the third communication device. Furthermore, process 900 may involve processor 710 switching, by the one or more host interfaces and the one or more client interfaces of transceiver 730, to communicate on the channel on which the second communication device communicates.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising: establishing, by a first communication device, a communication link with a second communication device to connect to the second communication device, the first communication device associated with a first weight, and a first group identifier, the second communication device associated with a second weight, and a second group identifier; determining, by the first communication device, whether the first group identifier and the second group identifier are identical; responsive to a determination that the first group identifier and the second group identifier are identical, comparing, by the first communication device, the first weight and the second weight; and responsive to the comparing, adopting, by the first communication device, a configuration of the second communication device by receiving data related to the configuration of the second communication device from the second communication device.

2. The method of claim 1, wherein the first communication device comprises a single-band communication device configured to communicate over a single frequency band, and wherein the first weight comprises a unique identifier associated with a host interface of the first communication device.

3. The method of claim 1, wherein the first communication device comprises a dual-band communication device configured to communicate over two frequency bands, and wherein the first weight comprises a unique identifier associated with a host interface of the first communication device for one of the two frequency bands.

4. The method of claim 1, wherein the adopting of the configuration of the second communication device comprises adopting the configuration of the second communication device at each host interface and each client interface for each frequency band over which the first communication device is configured to communication wirelessly.

5. The method of claim 1, further comprising:
responsive to a determination that the second weight is higher than the first weight, transmitting, by the first communication device, the data related to the configuration of the second communication device to a third communication device that is connected to the first communication device such that the third communication device adopts the configuration of the second communication device.

6. The method of claim 5, wherein the determining of which of the first weight and the second weight is higher comprises receiving a first action from the second communication device indicating the second weight which is higher than the first weight, and wherein the transmitting of the data related to the configuration of the second communication device to the third communication device comprises transmitting a second action frame to the third communication device to trigger the third communication device to adopt the configuration of the second communication device.

7. The method of claim 1, further comprising:
responsive to a determination that the first group identifier and the second group identifier are not identical, performing either of:
in an event that the communication link is between a client interface of the first communication device and a host interface of the second communication device, adopting, by the first communication device, the configuration of the second communication device by receiving the data related to the configuration of the second communication device from the second communication device; or in an event that the communication link is between a host interface of the first communication device and a client interface of the second communication device, transmitting, by the first communication device, the data related to the configuration of the first communication device to the second communication device such that the second communication device adopts the configuration of the first communication device.

8. The method of claim 7, wherein the transmitting of the data related to the configuration of the first communication device to the second communication device comprises transmitting an action frame to the second communication device to trigger a group identifier update from the second group identifier to the first group identifier for the second communication device.

9. The method of claim 7, further comprising:
in an event that the communication link is between the client interface of the first communication device and the host interface of the second communication device, transmitting, by the first communication device, the data related to the configuration of the second communication device to a third communication device that is connected to the first communication device such that the third communication device adopts the configuration of the second communication device.

10. The method of claim 1, further comprising:
responsive to a determination that the second communication device is not associated with any group identifier, transmitting, by the first communication device, the data related to the configuration of the first communication device to the second communication device such that the second communication device adopts the first group identifier and the configuration of the first communication device.

11. The method of claim 1, further comprising:
transmitting, by the first communication device to the second communication device, a first information element (IE) containing data related to a configuration of the first communication device upon the establishing of the communication link;
receiving, by the first communication device from the second communication device, a second IE containing the data related to the configuration of the second communication device upon the establishing of the communication link; and
forwarding, by the first communication device, the data related to the configuration of the second communication device to one or more other peer communication devices.

12. The method of claim 1, further comprising:
announcing, by the first communication device, an open merge capability in one or more beacons, one or more probe requests, or one or more probe responses indicating the open merge capability of the first communication device.

13. An apparatus implementable in a first communication device, comprising: a memory configured to store one or more sets of instructions; and a processor coupled to access the memory to execute the one or more instructions and, upon executing the one or more sets of instructions, the processor is configured to perform operations comprising:
establishing a communication link with a second communication device of the plurality of communication devices to connect to the second communication device, with the first communication device associated with a first weight, and a first group identifier; and with the second communication device associated with a second weight, and a second group identifier; determining whether the first group identifier and the second group identifier are identical; responsive to a determination that the first group identifier and the second group identifier are identical, determining which of the first weight and the second weight is higher; and
performing one or more of:
responsive to a determination that the second weight is higher than the first weight, adopting a configuration of the second communication device by receiving data related to the configuration of the second communication device from the second communication device;
responsive to a determination that the first weight is higher than the second weight, transmitting data related to a configuration of the first communication device to the second communication device such that the second communication device adopts the configuration of the first communication device; or
responsive to a determination that the second communication device is not associated with any group identifier, transmitting the data related to the configuration of the first communication device to the second communication device such that the second communication device adopts the first group identifier and the configuration of the first communication device.

14. The apparatus of claim 13, wherein, in adopting the configuration of the second communication device, the processor is configured to adopt the configuration of the second communication device at each host interface and each client interface for each frequency band over which the first communication device is configured to communication wirelessly.

15. The apparatus of claim 13, wherein the processor is further configured to perform operations comprising:
responsive to a determination that the second weight is higher than the first weight, transmitting the data related to the configuration of the second communication device to a third communication device that is connected to the first communication device such that the third communication device adopts the configuration of the second communication device.

16. The apparatus of claim 15, wherein, in determining which of the first weight and the second weight is higher, the processor is configured to receive a first action from the second communication device indicating the second weight which is higher than the first weight, and wherein, in transmitting the data related to the configuration of the second communication device to the third communication device, the processor is configured to transmit a second action frame to the third communication device to trigger the third communication device to adopt the configuration of the second communication device.

17. The apparatus of claim 13, wherein the processor is further configured to perform operations comprising:
responsive to a determination that the first group identifier and the second group identifier are not identical, performing either of:
in an event that the communication link is between a client interface of the first communication device and a host interface of the second communication device, adopting the configuration of the second communication device by receiving the data related to the configuration of the second communication device from the second communication device; or in an event that the communication link is between a host interface of the first communication device and a client interface of the second communication device, transmitting the data related to the configuration of the first communication device to the second communication device such that the second communication device adopts the configuration of the first communication device.

18. The apparatus of claim 17, wherein, in transmitting the data related to the configuration of the first communication device to the second communication device, the processor is configured to transmit an action frame to the second communication device to trigger a group identifier update from the second group identifier to the first group identifier for the second communication device.

19. The apparatus of claim 17, wherein the processor is further configured to perform operations comprising:

in an event that the communication link is between the client interface of the first communication device and the host interface of the second communication device, transmitting the data related to the configuration of the second communication device to a third communication device that is connected to the first communication device such that the third communication device adopts the configuration of the second communication device.

* * * * *